(No Model.)  S. W. ROBINSON.  5 Sheets—Sheet 1.
MACHINE FOR UNITING THE SOLES AND UPPERS OF BOOTS OR SHOES.
No. 325,274.  Patented Sept. 1, 1885.
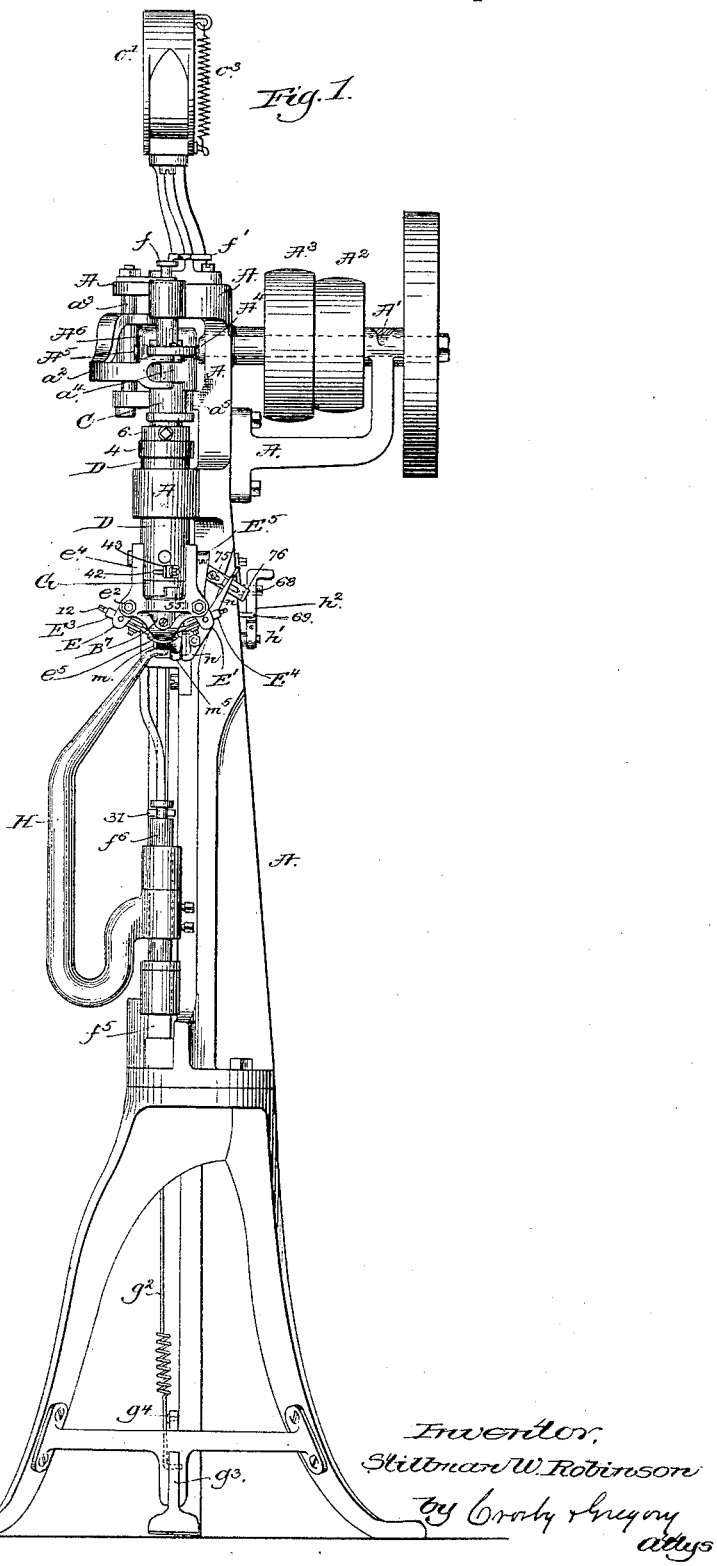

(No Model.) 5 Sheets—Sheet 2.
S. W. ROBINSON.
MACHINE FOR UNITING THE SOLES AND UPPERS OF BOOTS OR SHOES.
No. 325,274. Patented Sept. 1, 1885.
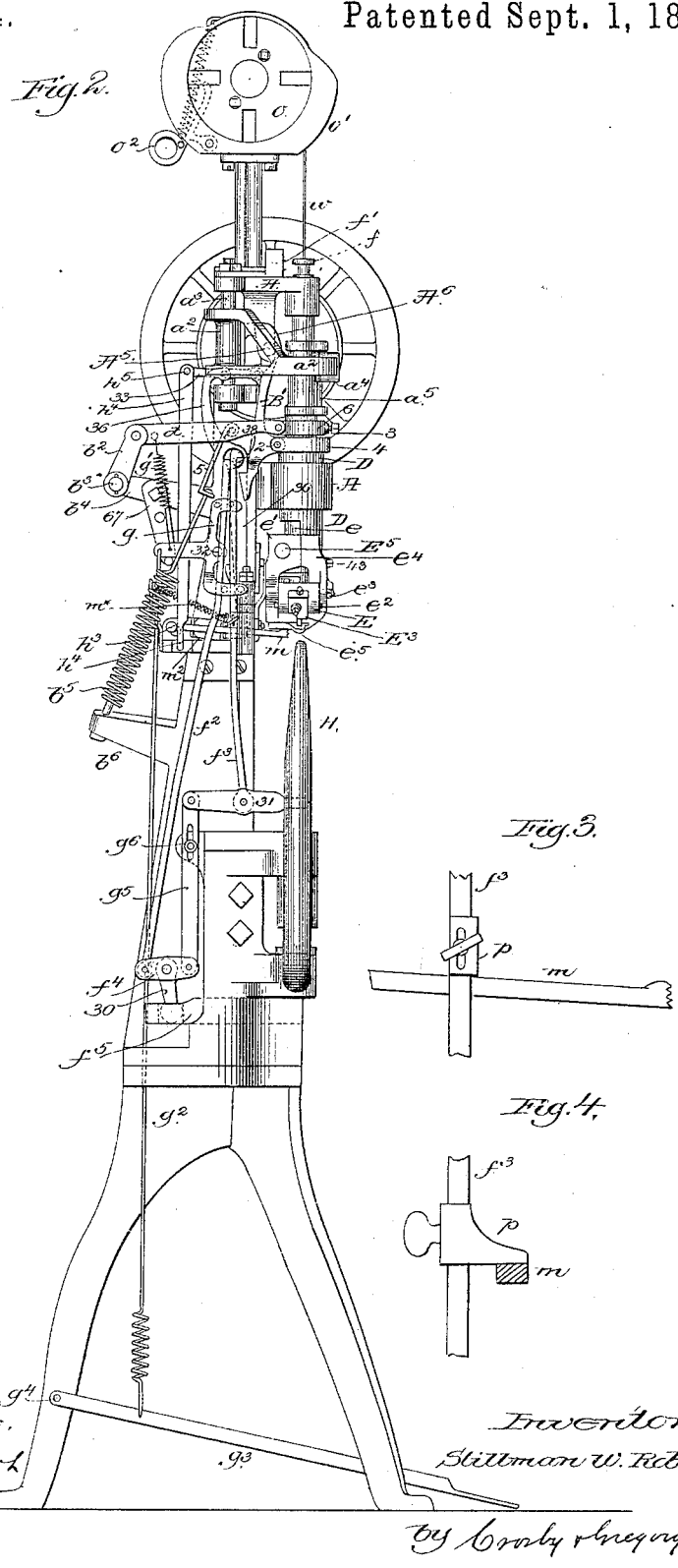

(No Model.) 5 Sheets—Sheet 3.
S. W. ROBINSON.
MACHINE FOR UNITING THE SOLES AND UPPERS OF BOOTS OR SHOES.
No. 325,274. Patented Sept. 1, 1885.
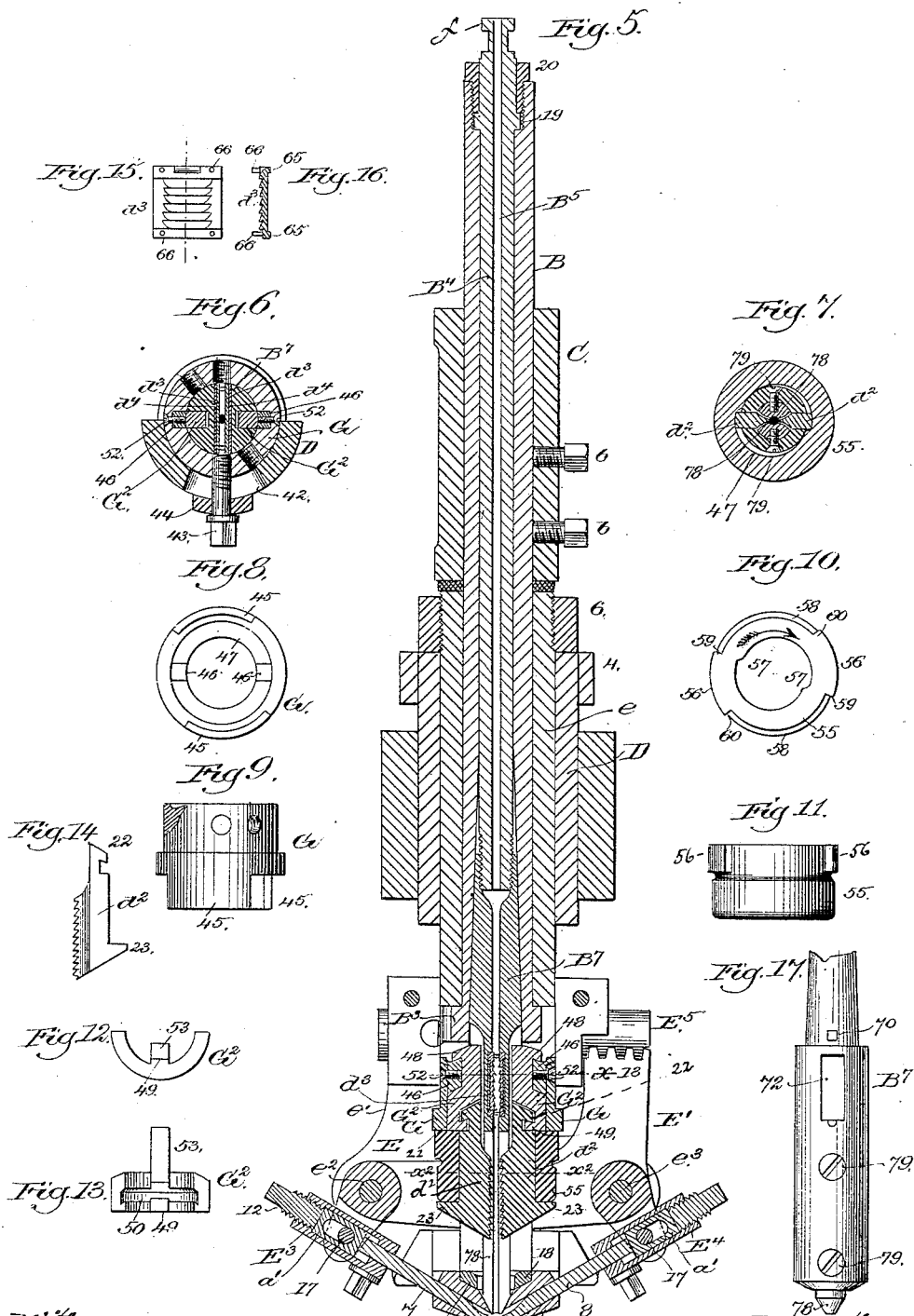
Witnesses.
Inventor.
Stillman W. Robinson.
Crosby & Gregory attys.

(No Model.)  5 Sheets—Sheet 4.
S. W. ROBINSON.
MACHINE FOR UNITING THE SOLES AND UPPERS OF BOOTS OR SHOES.
No. 325,274. Patented Sept. 1, 1885.
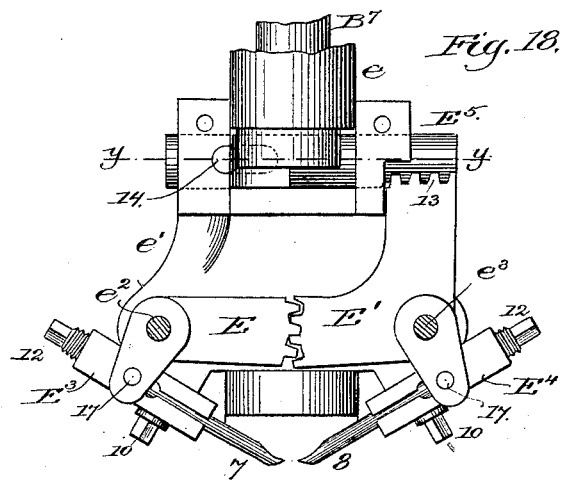
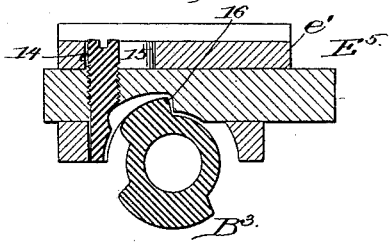
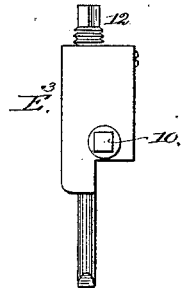 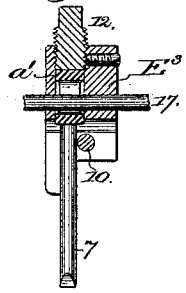 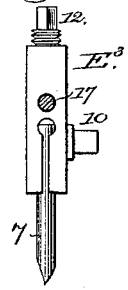
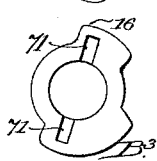 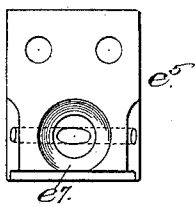
Witnesses.
John F. C. Pinkert
B. J. Noyes
Inventor:
Stillman W. Robinson
by Crosby & Gregory attys.

(No Model.) 5 Sheets—Sheet 5.
S. W. ROBINSON.
MACHINE FOR UNITING THE SOLES AND UPPERS OF BOOTS OR SHOES.
No. 325,274. Patented Sept. 1, 1885.
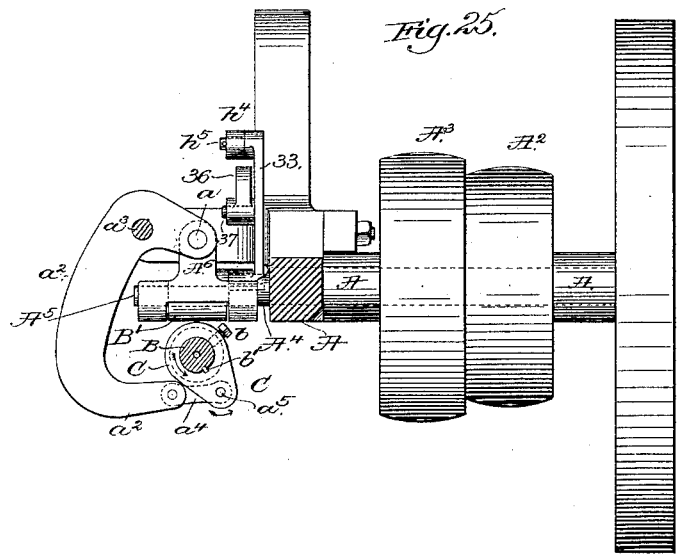
Fig. 25.
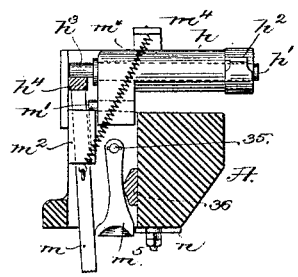
Fig. 26.
Fig. 27.
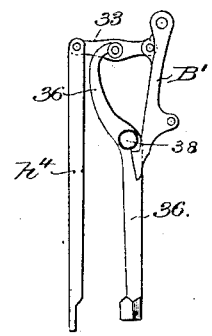
Fig. 28.

United States Patent Office.

STILLMAN W. ROBINSON, OF COLUMBUS, OHIO.

MACHINE FOR UNITING THE SOLES AND UPPERS OF BOOTS OR SHOES.

SPECIFICATION forming part of Letters Patent No. 325,274, dated September 1, 1885.

Application filed October 13, 1884. (No model.)

*To all whom it may concern:*

Be it known that I, STILLMAN W. ROBINSON, of Columbus, county of Franklin, State of Ohio, have invented an Improvement in Machines for Uniting Soles and Uppers of Boots and Shoes, of which the following description, in connection with the accompanying drawings, is a specification, like letters on the drawings representing like parts.

This invention relates to and is an improvement upon the machine described in United States Letters Patent No. 297,718, granted to me April 29, 1884, and to which reference may be had, the object of my invention being to simplify the construction and operation of the said parts, whereby the wire may be more accurately driven and partially turned and cut off, and whereby the horn may be raised and lowered automatically and the shoe or boot be more accurately fed over the horn.

The novel features of my invention will be fully described in the following specification, and will be thereafter specifically set forth in the claims at the end of the specification.

Figure 1 is a front elevation of a machine embodying my improvements. Fig. 2 is a left-hand side elevation of Fig. 1; Figs. 3 and 4, details of the feed and devices to keep it in proper position with relation to the edge of the sole. Fig. 5 is a longitudinal sectional detail of the working-head, presser-plate-carrying sleeve, spindle, and cutting mechanism; Fig. 6, a partial section of Fig. 5 in the dotted line $x$; Fig. 7, a section in the line $x^2 x^2$. Fig. 8 is an under side view of the tappet-ring, to be described, which actuates the cam-ring; Fig. 9, a side elevation, partially broken out of the said ring in Fig. 8; Figs. 10 and 11, a top and side elevation of the cam-ring; Figs. 12 and 13, respectively, under and inner side views of the gripper-carriers; Fig. 14, a side elevation of one of the grippers; Figs. 15 and 16, an inner side view and section of one of the wire-detaining jaws. Fig. 17 is a detail in side elevation of the spindle-head; Fig. 18, an enlarged view, chiefly to show the cutters and the devices for operating them; Fig. 19, a section of Fig. 10 in the dotted line $y\, y$; Figs. 20 to 22, details of the cutting mechanism; Fig. 23, a top view of the presser-plate. Fig. 24 is an under side view of the collar fast upon the lower end of the spindle; Fig. 25, a detail to illustrate the devices for rotating the spindle; Fig. 26, a detail of the shoe-feeding device; Fig. 27, a rear side elevation of the rod-controller, and Fig. 28 a detail to be referred to.

The frame-work A of the machine, of proper shape to support the various parts, is provided with suitable bearings for the main shaft $A'$, having fast upon it two pulleys, $A^2$ $A^3$, which receive a driving-belt, the difference in the diameter of the said pulleys enabling the machine to be run at a faster or slower speed. The shaft $A'$ has at its inner end an offset, $A^4$, provided with a crank-pin, $A^5$, that enters a hole in the end of the knuckle-piece $A^6$, the said crank-pin also passing through a hole made in the pitman $B'$, which at a point below the crank-pin $A^5$ is pivoted or jointed by a pin, 2, directly to a collar or head, 4, which is attached to or forms part of the upper end of the working head D, so that the pitman imparts a uniform reciprocating movement to the working-head whatever may be the thickness of the stock, as in my patent referred to. The knuckle-joint piece has a backward extension, (see Fig. 25,) which, by a vertical pin, $a$, is connected with one end of a yoke, $a^2$, having its fulcrum upon a vertical rod, $a^3$, held rigidly by the frame-work A. The free end of the yoke $a^2$, bent around to the front of the machine, has pivoted to it a link, $a^4$, bored at its end farthest from its yoke to embrace loosely and slide on a pin, $a^5$, held in ears of a collar, C, fixed by screws $b$ and spline $b'$ upon the hollow oscillating spindle B, made in parts, as will be described, through which and the parts $B^5$ $B^7$ within it is passed the wire or fastening material $w$, which is to be inserted into the sole and upper and then partially turned therein, as described in the patent referred to. The rotation of the shaft $A'$ through the end of the knuckle-joint piece $A^6$ causes the yoke $a^2$ to slide up and down upon the fulcrum-pin $a^3$, and the link $a^4$ to slide on the pin $a^5$, and at the same time the said crank-pin and knuckle-joint piece cause the yoke $a^2$ to be vibrated about the fulcrum-pin $a^3$ as a center, thus rotating the spindle, when desired, for about a quarter-turn in either direction, as will be described. The presser-plate carrying sleeve $e$, interposed between the spindle B and the working-head D, has a collar, 6, screwed upon its upper end, (see Fig. 5,) which is jointed to a lever, $d$, having its fulcrum upon a link, $b^2$, in turn pivoted at $b^3$ upon an arm, $b^4$, of the frame-work. The lever $d$ is normally held down by a spring, $b^5$, attached to an ear, $b^6$, and the spring is joined by a link, 5, with the said lever, the collar 6 of the sleeve $e$ being thus normally kept pressed against the top of the working-head D, so that the sleeve $e$ rises with the working-head; but the descent of the sleeve, as will be described, will be arrested sooner or later during the descent of the working-head, according to the thickness of the stock on the horn. The lower end of the presser-plate-carrying sleeve $e$ has attached to or forming an integral part of it a bearing-plate, $e'$, provided with pins or studs $e^2$ $e^3$, which serve as fulcra for the working levers or arms E E', with which are adjustably connected the blades or cutters 7 8, (see Figs. 5 and 18,) which act to sever the fastening material after the end thereof has been inserted into the stock resting on the horn. The lower arms or ends of the rocking levers E E' are forked or provided with ears for the reception of the cutter-holding clamping-blocks E³ E⁴, each being bored for the reception, and split and provided with a clamping-screw, 10, for the retention of one of the cutters.

To adjust the cutters longitudinally, each block is provided with a hole in which is placed the transversely-slotted plug $a'$, which is acted upon by the adjusting-screw 12, the inner end of the plug bearing against the rear end of the shank of the cutters 7 or 8, the slot in the plug affording a passage for the pin 17, which supports the said block in its lever E or E'. Portions of the rocking arms E E' are provided with teeth, (see Fig. 18,) so that they are compelled to move together, the arm E deriving its movement from the arm E', the latter having teeth 13, which, at the termination of each partial rotation of the spindle B, are acted upon by the teeth of the rack-bar E⁵, fitted to slide in guides in the bearing-plate $e'$, a screw, 14, inserted through the said bar and extended into a slot, 15, in the plate $e'$, guiding the said rack-bar during its reciprocation in opposite directions by the projection 16, formed by cutting away a part of the collar B³, forming part of the lower end of the spindle B, the said pin 14 being notched or cut away to serve as one of the corners against which the projection 16 strikes when the levers E E' are turned to separate the cutters. The presser-plate $e^6$ is countersunk at its upper side, as at $e^7$, to receive the conical lower end, 18, of the spindle-head B⁷, and below the surface against which the conical end of the spindle-head rests the said presser is provided with two holes (see Figs. 5 and 23) which receive and guide the cutters or blades 7 8, the presser-plate, when the cutters are operaed to sever the fastening material close to the stock, being held stationary. The collar B³, at the lower end of the spindle B, serves as a shoulder against which the lower end of the presser-plate-carrying sleeve $e$ bears, the latter, when permitted to descend under the action of the spring $b^5$ and lever $d$, as is the case while the working-head D is being depressed, descending with the said sleeve until the presser-plate meets the stock on the horn H, further downward movement of the working-head causing the grippers then grasping the wire to drive the same into the stock. The spindle B, made as a sleeve, is provided with a removable hollow center piece, B⁴, having a passage, B⁵, for the wire $w$. The spindle near its upper end has a shoulder which receives against it the collar 19 of and supports the center piece, B⁵, the latter being prevented from rising therein by the hollow nut 20. The center piece is screw-threaded at its lower end for the reception of the head B⁷ of the spindle B, containing the wire-grippers $d^2$, their actuating devices, and the wire-detainers, as will be described. The upper end of the spindle-head is inserted into the open lower end of the spindle B until a projection, 70, thereon enters one of the notches 71 (see Fig. 24) in the collar B³, the said projection and collar preventing rotation of the spindle-head in the spindle, and thereafter the center piece thrust down through the spindle is screwed into the spindle-head; but before the spindle-head is so applied to the spindle, the head is provided with all the devices to be carried by it. The spindle-head B⁷ is slotted near its lower end from side to side for part of its length (see Fig. 5) to form spaces for the reception of the toothed wire-grippers $d^2$, which grasp the flat sides of the wire $w$, the said grippers, one of which is shown in Fig. 14, having at their upper ends hooks 22, and at their lower ends projections 23, the grippers being fitted to slide freely in the slots of the said spindle-head in which they are placed. The spindle-head B⁷, at a point above the slots referred to, is slotted or cut through at right angles thereto, as at 72, (see Fig. 17,) to form openings for the reception of the two serrated or toothed detaining jaws or blocks $d^3$, one of which is shown in Figs. 15 and 16, said jaws placed in the said opening, as in Fig. 5, being acted upon at their rear sides by flat springs $d^4$, (see Fig. 6,) interposed between them and the spindle-head B⁷, the said springs causing the said jaws, which, preferably, are serrated, to act against the flat sides of the fastening material or wire, or to prevent the same from being lifted while the grippers $d^2$, relaxed from the fastening material, are being raised in unison with the working-head D to obtain a new hold on the wire and thrust or force the end thereof into the stock on the horn H. The detaining-jaws $d^3$, at their rear sides, are provided with projections 65, (see Fig. 16,) which come to a bearing against the sides of the slot 72 whenever any severe twisting-strain in the wire tends to reverse it between the said jaws; and to prevent the jaws from coming together when the wire is absent one of the said jaws is provided with pins 66, which at such time abut against the opposite jaw. The working-head D is slotted near its lower end, as at 42, (see Fig. 6,) to receive the screw 43, which is first extended through a washer, 44, the end of the said screw entering the tappet-ring G, and confining the same in fixed position with relation to the said head, the adjustment of the screw 43 in the slot 42 altering the position of the said tappet-ring G with relation to the working-head and the oscillating stroke of the spindle and spindle-head, so as to cause the wire-grippers to be thrown into engagement with the wire with more or less force. The farther the screw from the right-hand end of the said slot, viewing Fig. 3, the more severe will be the grip of the grippers upon the wire. The lower end of the tappet-ring G has two tappets, 45, (see underside view and elevation, Figs. 8 and 9,) and at its upper end the said ring has an inwardly-extended shoulder or flange, 47, which is grooved at opposite points for the passage of the hooked upper ends, 48, of the gripper-carriers $G^2$. (Shown separately in Figs. 12 and 13.) The gaps or grooves in flange 47 are filled in with flush-blocks 46, which are attached to the tappet-ring by screws 52 after the hooks 48 of the gripper-carriers have been passed above the flange 47, the flush-blocks enabling the formation of a smooth race on which the hooks 48 slide as they are moved in the arc of a circle by the spindle and spindle-head in their oscillation. The lower ends of the gripper-carriers $G^2$ are made segmental in shape to take an extended bearing in the tappet-ring, and are provided at their concaved sides with hooks or projections 49, that enter the longitudinal grooves of the spindle-head, as also do the portions 53 of the said carriers, the portions 53 and the projection 49 both sliding up and down in the said grooves in unison with the tappet-ring G and working-head D.

The wire-grippers $d^2$, provided at their upper ends with the hooks 22 and at their lower ends with shoulders 23, are extended up through a cam-ring, 55, provided externally with two projections, 56, and internally with two cam-surfaces, 57.

To assemble the parts the wire gippers $d^2$ are placed in the cam-ring 55, and the latter on the spindle with the wire-grippers in the longitudinal slots of the spindle-head, and the hooks 22 of the grippers, extended above the said cam-ring 55, are made to engage the projections 49 of the gripper-carriers supported by the tappet-ring, the cam-ring thus resting loosely upon the shoulders 23 of the grippers, and just below but free from contact with the lower end of the tappet-ring G. The cam-ring acts to keep the wire-grippers in the longitudinal slots of the spindle-head, and as the cam-ring is rotated on the spindle, the cam-surfaces 47, acting on the grippers, force them against the wire. The tappets 45 of the tappet-ring G enter the wider spaces 58 between the projections 56 of the cam-ring 55, and as the cam-ring is partially rotated with the spindle-head its corners 59 or 60, according to the direction of rotation of the spindle and collar, strike the tappets 45, and the cam-ring is stopped thereby while the spindle continues to turn, which results in moving the cam-ring on the spindle, the grippers being forced toward each other or being permitted to loosen their grip on the wire, according to the direction of rotation of the spindle when the cam-ring is arrested by the tappets 45. From a little before the end of the downstroke of the spindle to the time that the wire is cut off the shoulders 59 of the cam-ring rest against the tappets 45, and immediately after the wire is severed the rising spindle commences to turn in the direction of the arrow next to it, (see Fig. 25,) carrying the cam-ring 55 with it, and just before the spindle approaches its highest point the corners 60 of the said cam-ring are brought against the tappets 45, and by the time that the spindle reaches its highest position its continued further rotation causes the cam-ring resting against the said tappets to be turned on or with relation to the spindle in the direction to compel the cams 57 of the cam-ring to force the grippers $d^2$ inward upon and so as to grip the wire, the cam-ring and tappet-ring occupying substantially the same position until the spindle reaches nearly its downstroke, and during the lower stroke the spindle is rotated in the direction opposite the arrow, Fig. 25, causing the movement of the cam-ring in the proper direction to bring its projections 59 against the tappets 45, when, during a slight further movement at the extreme lower part of the stroke, the grippers are released. The upper end of the spindle B is provided with a projection, $f$, with which a spindle-arresting device, shown as a pivoted latch, $f'$, may be engaged when it is desired to arrest the descent of the spindle, as is frequently the case— as when, for instance, the horn is not provided with a boot or shoe, or when the wire is to be projected down into the nose and through the same preparatory to starting the machine. The pitman B', at or near its lower end, has a hook (see Fig. 2) which, during its ascent, is adapted to catch upon the upper hooked end of either the trip-rod $f^2$ or the horn-lifting rod $f^3$, to thus effect the lowering and raising, respectively, of the horn H through the horn-lifting mechanism, to be described. When the trip-rod $f^2$ is lifted to lower the horn H, the three-armed lever $f^4$, (see Fig. 2,) to which the said rod is connected, is turned upon its fulcrum, so that its arm 30 in engagement with the wedge $f^5$ is withdrawn from below the lower end of the horn-spindle $f^6$. The upper end of the horn-spindle is provided with an annular groove, (see Fig. 1,) which is entered by the forked end of the lever 31, with which the lifting-rod $f^3$ is connected. The rods $f^2$ and $f^3$ are moved into position to be engaged the one or the other by the hook of the pitman B', according as it is desired to lower or raise the horn by means of a rod-controller, $g$, pivoted at 32, the said controller being connected at its rear end to a spring, $g'$, which acts normally to cause the rod-controller—provided at its rear side (see Fig. 27) with two sets of pins, 83 84, between which are placed, respectively, the rods $f^2$ and $f^3$—to keep the trip-rod $f^2$ in the range of the hook of the pitman B', to depress the horn as the working-head reaches its most elevated position. The rod-controller $g$ is joined by a wire, $g^2$, or other suitable connection, with a treadle or lever, $g^3$, pivoted at $g^4$, so that the operator, by depressing the said treadle and operating the rod-controller, is enabled to engage the lifting-rod $f^3$ with the hook of the pitman B', to lift the horn H into position after the boot or shoe has been placed upon it. The first part of the upward movement of the rod $f^3$ and the lever 31 lifts the horn to its proper level, and as the lever 31 completes its movement, the link $g^5$, connected therewith and with the three-armed lever $f^4$, turns the latter in the direction to cause the arm 30 of the said lever to force the wedge $f^5$ under the lower end of the horn-spindle, thus locking the same in position positively before the presser-plate comes down upon the work.

Referring to the feeding mechanism, the frame-work (see Fig. 26) has attached to it at its rear side a sleeve-like bearing, $h$, which receives a shaft, $h'$, provided with a handle, $h^2$, by which to turn it, the other end of this shaft having an eccentric pin or projection, $h^3$, which, by the partial rotation of the said shaft, serves as a back stop or rest, against which may act the lower end of a cam-rod, $h^4$, pivoted at $h^5$ on a lever, 33, the inner end of which (see Figs. 2, 25, and 28) is pivoted to the pitman B', the descent of the said cam-rod in contact with the feeding-dog $m$, normally held back by a spring, $m^x$, causing the said dog to be moved forward toward and against the edge of the shoe or boot on the horn H. The position of the eccentric pin $h^3$ determines, it will be understood, the position of the front end of the feeding device with relation to the nose and tip of the horn, thus enabling the operator to control the insertion of the fastenings at a greater or less distance from the edge of the sole. The rear end of the feeding-dog $m$ is placed in a guide-block, $m^2$, having a pivot-pin, $m'$, which is inserted in the bearing $h$, the said pivot-pin being parallel with the shaft $h'$.

In the slot in the frame-work in which the feed-dog is made to vibrate horizontally I have placed an L-shaped dog, $m^5$, pivoted at 35, the rear beveled side of which is operated upon by the lower wedge-shaped end of a lever, 36, (see Figs. 25 to 28,) pivoted at 38 (see Figs. 2 and 28) upon the frame-work, the upper end of the said lever being connected by a pin, 37, with the lever 33, before described, which has its front end pinned to the pitman B', that operates the working-head D, the said lever 33 carrying, it will be remembered, the cam-rod $h^4$. A piece, 67, attached to an arm of the frame-work and provided with two stops, limits the movement of the rod-controller $g$. At the outer side of the frame-work, near the handle $h^2$, (see Fig. 1,) are two suitable stops, 68 and 69, to limit the movement of the said handle.

To vary the feeding movement of the feed-dog $m$, I have pivoted upon the front of the machine a hand-lever, $n$. The lower end, acting against the dog $m^5$, referred to, may be made to arrest its backward movement, and consequently of the feed-dog $m$ sooner or later, to thus correspondingly lessen or increase the effective stroke of the lever 36 upon the inclined back of the dog $m^5$ in its next movement. The lever $n$, placed between the stops 75 and 76, may be moved by hand while the machine is in motion, to thereby vary the spacing between the fastenings, as may be desired. The stops 75 and 76, co-operating with this lever $n$ are made adjustable, (see Fig. 1,) so that the operator may have one stop for spacing about the fore part and another for spacing in the shank, moving the lever $n$ in contact with first one and then the other of the said stops. The spool $o$, upon which the threaded fastening material $w$ is wound, is composed of two side plates held together by suitable bolts, the flanges of the heads being preferably slotted or provided with holes to enable the operator to observe the quantity of wire thereon. The spool-holder $o'$ is a concaved bracket having suitable flanges to receive the spool, the bracket being open in suitable manner at its under side for the passage of the wire $w$ from the spool down through the spindle.

To produce the proper amount of friction upon the wire, I have provided the spool-holder with a friction-pad, $o^2$, operated upon by a spring, $o^3$, the pad resting on the wire.

The stop $p$ on the rod $f^3$ enables the forward end of the feed-dog $m$ to be held down next to the tip of the horn H when the same is in its lowest position, so that the edge of a shoe when applied to the horn comes directly against the end of the feed-dog, and as the horn is raised the rod $f^3$ and stop $p$ also rise, permitting the feed-dog $m$, the front edge of which is in contact with the edge of the sole, to rise with the shoe and horn without obstruction until the dog arrives in substantially horizontal position, after which the feed-dog is moved to feed the shoe on the horn.

The particular stop $p$, herein shown as made adjustable on the rod $f^3$, is not herein claimed by me either singly or in combination with the rod $f^3$; nor do I herein claim the mechanism shown for raising and lowering the horn or keeping it raised, as such mechanism, together with means for controlling the vertical position of the outer end of the feed-dog with relation to the tip of the horn, is made the subject-matter of another application, Serial No. 152,570, filed by me January 12, 1885.

The working-head D in this my present invention receives within it the nose or presser-carrying sleeve, and the spindle is placed centrally with relation to and has its bearings in the said sleeve, which results in a very compact arrangement of parts.

The cutters are operated positively in both directions, and the horn is raised and lowered at the proper times mechanically.

I do not herein broadly claim a cam-ring by which to operate the grippers, as such cam-ring, combined with the grippers, slotted spindle-head, and working-head D, is made the subject-matter of broad claim in my application Serial No. 152,571, filed January 12, 1885.

I claim—

1. The shaft, its crank-pin, the knuckle-piece, the pitman, and connected working-head D, combined with the yoke and spindle B, with which it is connected, the said yoke receiving a vibrating motion to oscillate the spindle and rising and falling with the knuckle-pin, substantially as described.

2. The reciprocating working-head, the presser-plate-carrying sleeve, and the reciprocating and oscillating spindle, combined with an independent stop adapted to arrest the descent of the spindle when desired, substantially as described.

3. The uniformly-reciprocating working-head made as a sleeve, and the spindle B, combined with the interposed sleeve $e$, having at its lower end the bearing-plate $e'$ and supporting the presser-plate, substantially as described.

4. The sleeve $e$, the bearing-frame $e'$ at its lower end provided with the pins or studs $e^2$ $e^3$, and the cutter-carrying levers geared together, as described, and the cutters, combined with means to actuate the said levers to operate the cutters and sever the fastening material, substantially as described.

5. In a machine for uniting soles to uppers, the spindle B, the center piece, and the attached spindle-head, slotted as described, combined with grippers to engage the wire, and with means, substantially as described, to operate the grippers, as set forth.

6. In a machine for uniting soles to uppers, the spindle-head $B^7$, combined with the detaining-jaws placed therein and with the spring $d^4$, to operate substantially as described.

7. The spindle-head provided with the slot or opening 72, combined with the detaining-jaws provided at their rear sides with projections 65, substantially as described.

8. The spindle-head provided with the slot or opening 72, combined with the detaining-jaws, one of which is provided with pins, substantially as described 9. The spindle B, its collar $B^3$, slotted at 71, and the spindle-head provided with the projection 70, combined with the center piece, $B^4$, substantially as described.

10. The spindle, the spindle-head, the reciprocating working-head D, and attached ring G, having a race, 47, combined with the gripper-carriers suspended by the said ring and adapted to operate the grippers, substantially as described.

11. The spindle, the slotted spindle-head, the reciprocating working head, and attached ring G, provided with a projection or race, 47, and with tappets, combined with the gripper-carriers and the grippers $d^2$, and with the cam-ring which is arrested by the said tappets, substantially as described.

12. The working-head and its attached ring, combined with the slotted spindle-head, and with the gripper-carriers made as segments to embrace the spindle-head, and having projections 48 and 49, to operate substantially as described.

13. In a machine for uniting soles to uppers, the slotted rotating and reciprocating spindle-head, grippers $d^2$ therein, and gripper-carriers, combined with the working-head, its attached ring provided with the race 47, and with the flush-blocks to complete the said race after the hooks of the gripper-carriers are passed above the said race, substantially as described.

14. In a nailing-machine to unite soles to uppers, a uniformly-reciprocating working-head, a spindle, and spindle-head therein, grippers, gripper-carriers, and detaining jaws, and the horn, combined with mechanism, substantially as described, to automatically lift the horn and lock it in place before the wire is driven into the stock on the horn and to automatically release the horn to depress the same, as set forth.

15. In a machine to unite soles and uppers, the feed-dog $m$, its pivoted guide, and the shaft $h$ and its eccentric pin, combined with the cam-rod $h^4$, and means, substantially as described, to operate it.

16. The feed-dog $m$, the pivoted guide, the cam-rod, an adjustable pin or support therefor, and the inclined dog $m^5$, combined with a lever to move the said dog to effect the lateral movement of the feed-dog.

17. In a machine for inserting metal fastenings into the soles of boots and shoes, a horn, a feed-dog, $m$, and means, substantially as described, to move the same to effect the feeding of the boot or shoe intermittingly on the horn, combined with a lever, change of position of which enables the spacing of the fastening at any desired distance from each other while the machine is in operation, substantially as described.

18. The horn, the presser-plate, the feed-dog, the shaft $h$, crank-pin $h^3$, and means to turn it to place the said crank-pin more or less distant from the center of the presser and axis of the horn, combined with a cam-rod to move the feed-dog and place its acting front end more or less distant from the axis of the horn, the front end of the feed-dog acting as a gage to insure the insertion of the fastenings more or less distant from the edge of the sole, substantially as described.

19. In a machine for uniting soles to uppers, the levers E E', the cutter-holding clamping-block E³ E⁴, and the cutters 7 8, combined with the presser-plate provided with holes for the guidance of the said cutters, substantially as described.

20. In a machine for uniting soles to uppers, the levers E E', the cutter-holding clamping-blocks E³ E⁴, and cutters, combined with the adjusting-screws 12 and the slotted plugs $a'$, to operate substantially as described.

21. The ring G, provided with a race, and gripper-carriers supported by the said race, combined with the grippers, to operate substantially as described.

22. In a machine to unite soles to uppers, the tappet-ring provided with a race having removable flush-blocks 46, substantially as described.

23. The working-head, the tappet-ring G, connected therewith, the slotted spindle-head, and the grippers provided with shoulders 54 and means to suspend the said grippers loosely with relation to the said ring, combined with the cam-collar interposed between the said tappet-ring and the projections 54 of the grippers, substantially as described.

24. In a machine to unite soles to uppers, the slotted spindle-head, the grippers 23, inserted in the slots of the said spindle-head, and provided near their lower ends with shoulders 54 and at their upper ends with hooks, and means to support loosely and reciprocate the said grippers in the slots of the spindle-head, combined with the loosely-supported cam-ring 55, to retain the grippers in the slots of the spindle and to actuate the grippers to grasp the wire, substantially as described.

25. The slotted spindle-head, the working-head, its attached ring G, provided with the tappets 45, and the loosely-suspended toothed grippers provided at or near their upper ends with hooks and near their lower ends with shoulders 23, combined with the ring 55, having cams 57 and recesses 58, the said ring being supported frictionally by the said grippers, substantially as described.

26. The slotted spindle-head, means, substantially as described, to partially rotate it, and the toothed grippers to feed the wire and the tappet-ring, combined with the loosely-supported cam-ring surrounding the said spindle-head and to actuate the grippers, substantially as described.

27. The cutter-carrying levers E E', geared together as described, combined with the sliding rack-bar having teeth to engage the teeth 13 of the lever E', substantially as described.

28. The feed-bar $m$, the lever 33, and means to move it, combined with the lever 36 and the cam-rod $h^4$ to control the movements of the feed-bar, substantially as described.

29. The spindle-head $B^7$, slotted longitudinally for the reception of the grippers, and provided with the slot 72 at right angles to the gripper-receiving slots for the reception of the detaining jaws or blocks, and the toothed grippers and the detaining jaws or blocks, combined with the reciprocating working-head and the cam-ring, and with means, substantially as described, to effect the movement of the said head and ring to actuate the grippers, for the purposes set forth.

30. In a machine for uniting the uppers and soles of boots and shoes, the tappet-ring having tappets 45, the slotted spindle-head provided with toothed grippers for feeding the wire, and the gripper-operating loose ring provided with tappet projections and surrounding the said spindle-head, said loose ring being provided with tappet projections to engage with the tappets 45, carried on the working-head, combined with means, as described, for partially rotating the slotted spindle-head.

In testimony whereof I have signed my name to this specification in the presence of two subscribing witnesses.

STILLMAN W. ROBINSON.

Witnesses:
G. W. GREGORY,
B. J. NOYES.